United States Patent
Hertel et al.

(10) Patent No.: US 9,434,917 B2
(45) Date of Patent: Sep. 6, 2016

(54) WORT BOILING METHOD AND APPARATUS

(75) Inventors: Marcus Hertel, St. Moritz (CH); Karl Sommer, Freising (DE)

(73) Assignee: Katja Isabel Schiffer, Zuoz (CH)

( * ) Notice: Subject to any disclaimer, the term of this patent is extended or adjusted under 35 U.S.C. 154(b) by 2206 days.

(21) Appl. No.: 11/651,327

(22) Filed: Jan. 9, 2007

(65) Prior Publication Data

US 2007/0154616 A1    Jul. 5, 2007

(30) Foreign Application Priority Data

Jul. 17, 2004 (DE) .................. 10 2004 034 555
Apr. 15, 2005 (DE) .................. 10 2005 017 457
Jul. 14, 2005 (WO) ................. PCT/EP2005/007663

(51) Int. Cl.
  *C12C 3/00* (2006.01)
  *C12C 13/08* (2006.01)
  *C12C 7/22* (2006.01)

(52) U.S. Cl.
  CPC ......... *C12C 13/08* (2013.01); *C12C 7/22* (2013.01)

(58) Field of Classification Search
  CPC ............................ C12C 13/08; C12C 7/22
  USPC ........... 426/11, 29, 520, 600, 487, 492, 488,
                                              426/490; 203/18, 19
  See application file for complete search history.

(56) References Cited

U.S. PATENT DOCUMENTS

| | | | |
|---|---|---|---|
| 2,415,337 A | * | 2/1947 | Carney .................. 208/349 |
| 4,550,029 A | | 10/1985 | Krueger et al. |
| 6,017,568 A | | 1/2000 | Visscher et al. |
| 2003/0044500 A1 | | 3/2003 | Seldeslachts |

FOREIGN PATENT DOCUMENTS

| | | |
|---|---|---|
| DE | 3126714 | 2/1983 |
| DE | 3618156 | 12/1987 |
| WO | WO 95/26395 | 10/1995 |
| WO | WO 97/15654 | 5/1997 |

OTHER PUBLICATIONS

Hertel "Untersuchungen zum Ausdampfverhalten von Aromastoffen bei der Wurzekochung aus verfahrenstechnischer Sicht", 2002, (Englsih Machine Translation).*
Perry, R.H.; Green, D.W. (1997). Perry's Chemical Engineers' Handbook (7th Edition).. McGraw-Hill. pp. 13-14, 13-15 Online version available at: http://www.knovel.com/web/portal/browse/display?_EXT_KNOVEL_DISPLAY_bookid=48 &VerticalID=0.*
Official Action of the German Patent Office (in German), Jun. 21, 2005.

(Continued)

*Primary Examiner* — Vera Stulii
(74) *Attorney, Agent, or Firm* — David M. Quinlan, P.C.

(57) ABSTRACT

An energy-saving method and apparatus for boiling wort in a beer brewing process is easily implemented and managed. The wort (W) to be boiled is supplied to a wort kettle (2) in a batchwise and discontinuous manner, and each batch (C) of wort (W) supplied to the wort kettle (2) is boiled during a boiling phase, whereby the wort vapor (D) escaping during the boiling phase is supplied to a vertical column (10) connected on the steam side to the wort kettle (2), and is rectified in the vertical column.

11 Claims, 3 Drawing Sheets

(56) References Cited

OTHER PUBLICATIONS

Werner Hemming, publication (in German), "Verfahrenstechnick," Vogel Verlag (Wurzburg), Aug. 8, 1999, pp. 154-160, from Official Action of the German Patent Office of Jun. 21, 2005.
Marcus Hertel, article (in German), "Studies on the Evaporation Behavior of Aromatic Substances During a Wort Boiling Process from a Process Engineering Standpoint," Chair for Mechanical and Equipment Engineering, Munich Technical Univ., 2002, pp. 34-37.
Klaus Sattler, book excerpt (in German), "Thermal Separation Processes," VCH (Weirheim), 1995, pp. 189-254, 271-286.
International Search Report (in German), Oct. 20, 2005, PCT/EP2005/007663.
Written Opinion of the International Searching Authority (translation), Jan. 30, 2007, PCT/EP2005/007663.
Marcus Hertel, "Studies on the Evaporation of Aromatic Compounds During Wort Boiling from a Process Engineering Standpoint" (2002)—English translation.

* cited by examiner

WORT BOILING METHOD AND APPARATUS

BACKGROUND OF THE INVENTION

1. Field of the Invention

The present invention relates to a method and apparatus for boiling wort in a beer brewing process.

2. Description of Related Art

In brewing, wort refers to the clear, liquid end product which results at the end of the refining process in the production of beer. In the conventional beer brewing process the wort is boiled to expel unwanted volatile aromatic substances in the boiling vapors. The wort boiling is also used for coagulation of the protein contained in the wort, destruction of the malt enzymes, sterilization of the wort, and isomerization of bittering hops. In addition, desirable aromatic substances are formed during the wort boiling.

In one classical brewing method used in particular in small and medium-sized breweries, the wort is introduced into a wort kettle in which the wort is boiled in a discontinuous, i.e., batchwise, manner. The wort vapor generated during boiling of the wort is discharged via the vapor outlet for the wort kettle. In addition, particularly in commercial brewing, methods are sometimes used in which the wort is boiled in a continuous flow.

The energy costs represent a significant cost factor in conventional beer production. Thus, the average heat requirements for the brewing process are approximately 145 to 185 MJ/hL of beer sold. The wort preparation, at 81 to 128 MJ/hL of beer sold, accounts for the greatest energy expenditure, so that achieving an energy-saving wort boiling method represents a significant opportunity for economizing.

It is known from M. Hertel, "Untersuchungen zum Ausdampfverhalten von Aromastoffen bei der Würzekochung aus verfahrenstechnischer Sicht," *Jahrbuch* 2002 *der Freunde des Lehrstuhls für Maschinen-und Apparatekunde e.V.*," a publication of the Chair for Mechanical and Equipment Engineering, Munich Technical University, 2002, to prepare the wort by rectification of the wort in order to increase the volatile components of the wort aromatic substances in the vapor and thus reduce the overall evaporation.

In brewing, rectification has been used heretofore in wort boiling in the form of a stripping process, in which the wort is continuously introduced into the head region of a stripping column, and while flowing inside this column is impinged in counterflow with inert gas or steam. The term "rectification" or "countercurrrent distillation" generally refers to a thermal/chemical separation process in which multiple distillation steps are discretely or continuously provided in succession by means of counterflow of two phases, in particular a vapor phase and a liquid phase in direct contact therewith. At the contact surface between the downwardly flowing wort and the counterflowing steam, volatile aromatic substances are absorbed by the steam and are thus removed from the wort. However, such methods as known from DE 31 26 714 A1, U.S. Pat. No. 4,550,029, WO 95/26395, and WO 97/15654 A1, for example, are relatively costly to implement, and therefore are generally economically feasible only in large-scale commercial brewing but not in small and medium-sized breweries.

A further disadvantage of the known stripping process is that during circulation of the wort through the stripping column, solid wort residues are deposited in the column, in particular at the column fittings. The column thus becomes contaminated and must be cleaned at frequent intervals. Since the fittings for a rectification column typically have a relatively finely branched structure, such a cleaning process entails significant effort.

SUMMARY OF THE INVENTION

An object of the present invention is to provide an energy-saving method for boiling wort which is easily implemented and managed. A further object of the present invention is to provide an apparatus which is particularly suited for carrying out the method.

With regard to the method, this object is achieved according to the invention by the features of claim 1. With regard to the corresponding apparatus, the object is achieved according to the invention by the features of claim 10.

In accordance with particular aspects of the invention, the wort to be boiled is supplied to a wort kettle in a batchwise, discontinuous manner, and during a boiling phase is boiled therein for a predetermined time at a boiling temperature which is specified essentially by the composition of the wort and the pressure conditions. The wort kettle is connected on the steam side to a vertical column, in which wort vapor escaping during this boiling phase is subjected to rectification in counterflow with the condensing vapor condensate.

BRIEF DESCRIPTION OF THE DRAWINGS

Exemplary embodiments of the invention are explained in greater detail below, with reference to the following drawings.

Corresponding parts and variables are always provided with the same reference numerals in all of the figures.

DETAILED DESCRIPTION OF PREFERRED EMBODIMENTS

Figure 1:
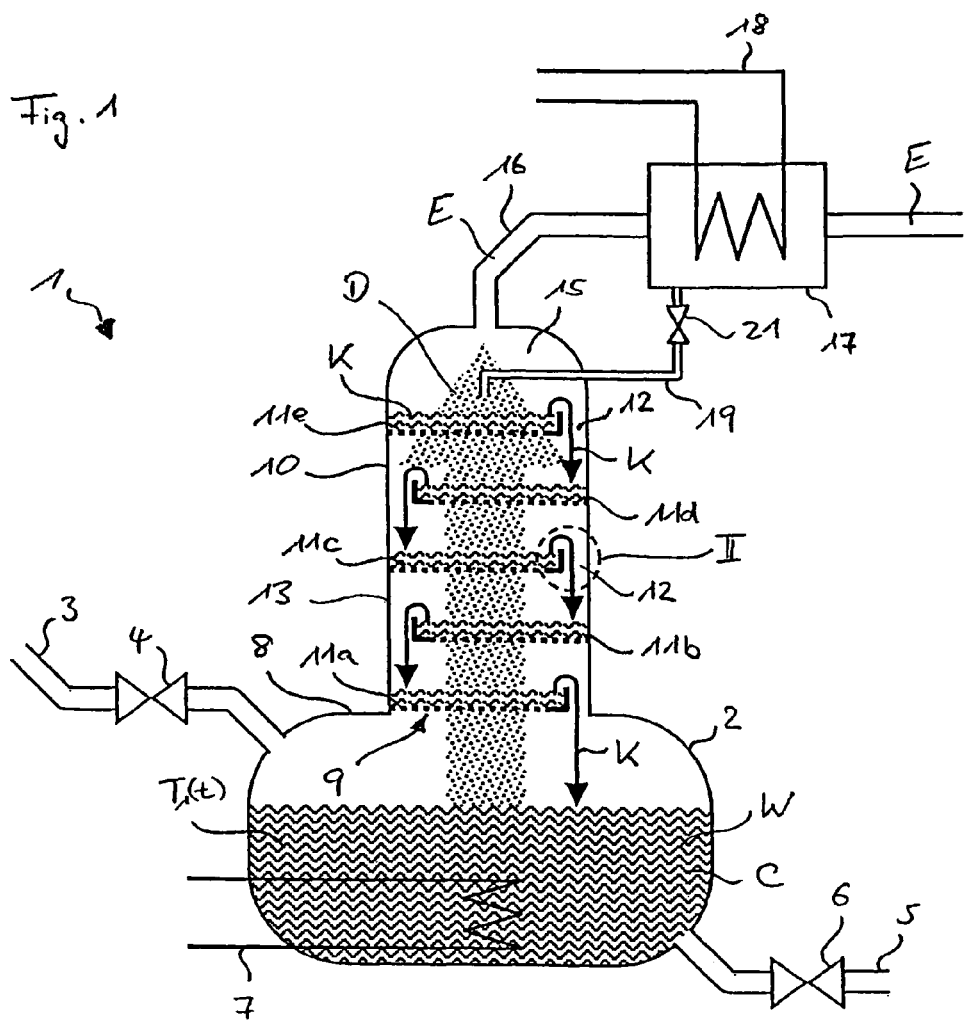
FIG. 1 shows in a schematic sectional illustration an apparatus for wort boiling, having a wort kettle and a vertical column connected thereto on the steam side, the vertical column being a plate column.

FIG. 1 schematically illustrates an apparatus 1 for boiling wort in a beer brewing process. The main part of the apparatus 1 is a wort kettle 2 as is used for boiling wort in a conventional beer brewing process. The wort kettle 2 is connected to a feed line 3 via which, by actuation of an intake valve 4 situated in the feed line 3, the wort kettle 2 may be charged with a discrete quantity (referred to as batch C) of the wort W to be boiled. The wort kettle 2 is also connected to a discharge line 5 via which, by actuation of an exhaust valve 6 provided in the discharge line 5, the batch C may be discharged from the wort kettle 2 after boiling. The wort kettle 2 also contains an internal or external heating element or device 7 by means of which the wort W received in the wort kettle 2 can be heated to a predetermined temperature in a regulated manner.

The wort kettle 2 is provided with a vapor outlet 9 in a top region 8. This vapor outlet 9 opens into the bottom region of a vertical column 10 mounted on top of the wort kettle 2. In the exemplary embodiment according to FIG. 1, the vertical column 10 is designed as a plate column, and contains as column inserts a plurality of column plates 11a through 11e which are arranged essentially horizontally, and therefore approximately perpendicular to the direction of flow of the ascending wort vapor D. Each column plate 11a-11e completely fills the cross section of the vertical column 10, with the exception of a downcomer 12 for vapor condensate K. The downcomer 12 for each column plate 11a-11e is respectively situated in the edge region of the latter, and thus adjacent to an outer wall 13 of the vertical column 10. The downcomers 12 for adjacent column plates 11a-11e are situated opposite one another to maximize the flow path of the vapor condensate K. The column plates 11a through 11e are provided with vapor passages 14 (FIG. 2) to enable vapor penetration through the column plates 11a through 11e. Each vapor passage 14 is designed as a slit, borehole, neck, etc. A baffle plate (not illustrated in greater detail), in particular a bubble cap, for the ascending wort vapor D may optionally be provided in the region of each vapor passage. To avoid heat losses to the greatest extent possible in the region of the vertical column 10, the outer wall 13 is insulated by insulation material or a vacuum jacket.

The head region 15 for the vertical column 10, located above the topmost column plate 11e, is connected to a vapor discharge line 16, through which the end vapor E collected in the head region 15 is discharged. A heat exchanger 17 for recovering the residual heat of the end vapor E is provided in the vapor discharge line 16. The recovered residual heat is supplied via a cooling/heating circuit 18 to other method steps used in the brewing process. The heat exchanger 17 is also used as a condenser. An adjustable portion of the vapor condensate K present in the heat exchanger 17 may be returned to the head region 15 of the vertical column 10 in a regulated manner via a return line 19. The heat exchanger 17 optionally includes a separator or decanter (not illustrated in greater detail) which causes only (or preferably) an aqueous phase of the vapor condensate to be returned via the return line 19, whereas an organic phase of the vapor condensate K is discharged. Such a separator may also be located in the head region of the vertical column 10. Use of a separator is advisable when the thermodynamic conditions in the head region of the vertical column 10 or in the heat exchanger 17 are set such that a phase separation of the vapor condensate K results. A dephlegmator is preferably used instead of a customary heat exchanger. Those skilled in the art will be able to construct advantageous embodiments of heat exchangers or condensers in accordance with the well known principles and configurations described in K. Sattler, "Thermische Trennverfarhen—Grundlagen, Auslegung, Apparte," 2nd Edition, VCH (Weinheim), 1995, Chapter 2.10, pp. 271-284, which is incorporated herein by reference.

For boiling the wort, in each case a batch C of the wort W to be boiled is discontinuously introduced into the wort kettle 2, where it is boiled during a boiling phase according to a predetermined boiling cycle $T_1(t)$.

The wort vapor D which escapes from the boiling wort W during the boiling phase passes through the vapor outlet 9 of the wort kettle 2 and into the vertical column 10, where it flows successively through the column plates 11a through 11e. Water and relatively low-volatility aromatic substances condense from the upwardly flowing wort vapor D and form the liquid vapor condensate K, which is collected on the column plates 11a through 11e as a liquid film.

Figure 2:
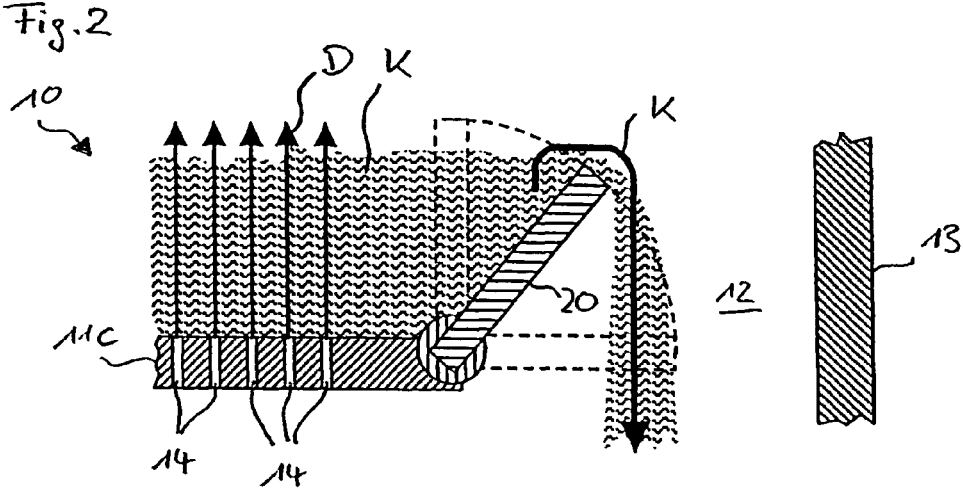
FIG. 2 shows a column plate of the vertical column together with an overflow weir, in an enlarged detail view based on FIG. 1.

An overflow weir 20 is associated with each column plate 11a-11e in the region of the respective downcomer 12 (using the example of column plate 11c, which is shown in an enlarged illustration in FIG. 2). Each overflow weir 20 is pivotably mounted so that the associated column plate 11a-11e may be drained if necessary. Instead of the pivotable overflow weir 20, a drain valve or the like may be used to drain the respective column plate 11a-11e.

The vapor condensate K collected on a column plate 11a-11e flows via the downcomer 12 for the respective column plate 11b through 11e to the next lower column plate 11a-11d, or from the lowest column plate 11a back to the wort kettle 2. The vapor condensate K thus flows in counterflow to the wort vapor D.

The partial condensation of the wort vapor D occurs in particular in the region of each column plate 11a-11e, in which the ascending wort vapor D comes into direct contact with the returning vapor condensate K. For an average vapor load, this two-phase zone is composed of an effervescent layer and, depending on the vapor load, a more or less pronounced spray layer as an entrainment zone for condensate droplets. In these layers, as the result of condensation of water and low-volatility aromatic substances from the wort vapor D, the volatile aromatic substances remaining in the gas phase are successively depleted. This separation effect is intensified by the evolved heat of condensation by virtue of heating of the returning vapor condensate K, thereby re-evaporating condensed volatile aromatic substances from the vapor condensate K. As a whole, this multistage distillation of the wort vapor D in the vertical column 10 markedly reduces the overall evaporation required during the boiling phase, while still achieving sufficient expulsion of unwanted volatile aromatic substances by depletion thereof in the end vapor E.

The end vapor E collected in the head region 15 of the vertical column 10 is exhausted through the vapor discharge line 16, and the residual heat of the end vapor E, as described above, is at least partially recovered by the heat exchanger 17.

The reflux ratio of the vapor condensate K is set during the boiling phase according to a predetermined temporal functional dependency by controlling the vapor condensate K flowing back per unit of time from the heat exchanger 17 via the return line 19, such that the briefest possible duration of the boiling phase and/or the lowest possible overall evaporation is achieved. The quantity of the vapor condensate K flowing back through the return line 19 into the vertical column 10 is controlled by a check valve 21 situated in the return line 19.

Figure 3:
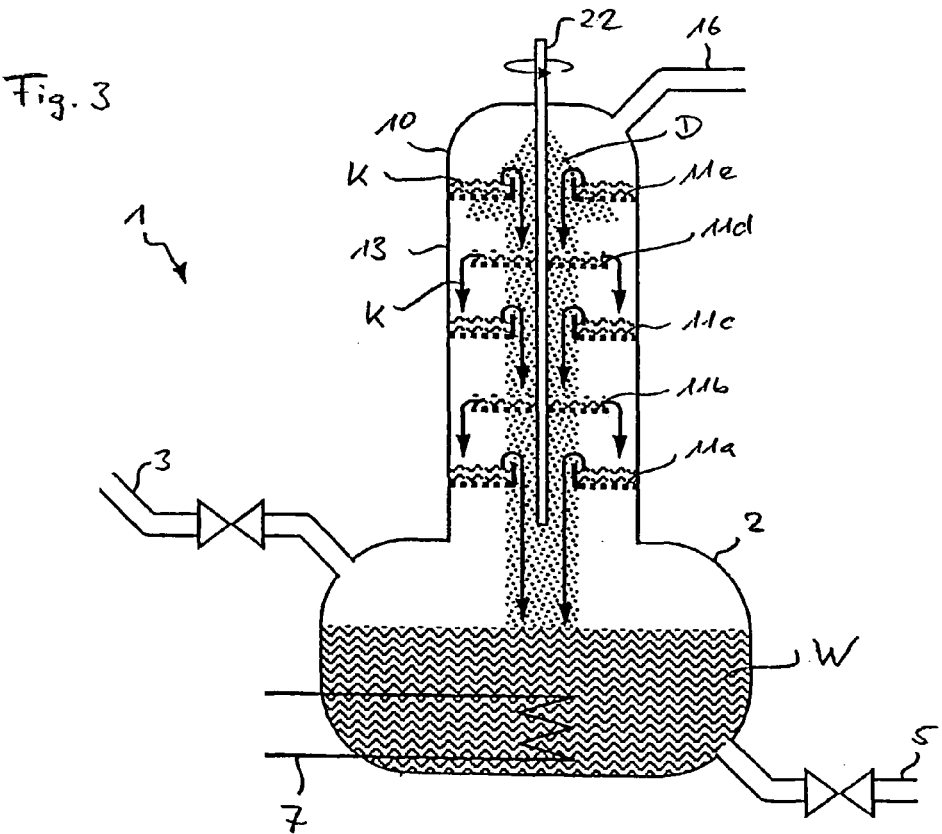
FIG. 3 shows one alternative embodiment of the apparatus in which the vertical column is equipped with two rotationally driven column plates, in an illustration based on FIG. 1.

FIG. 3 shows the wort kettle 2 and the vertical column 10 in one alternative embodiment of the apparatus 1. The vertical column 10 comprises two disk-shaped column plates 11b and 11d which are suspended in a rotationally driven manner on a central shaft 22 which is coaxially aligned with the axis of the vertical column 10. The rotating column plates 11b and 11d are positioned between annular column plates 11a and 11c or 11c and 11e, respectively, which are fixedly connected to the outer wall 13. A particularly good intermixture of the returning vapor condensate K and a particularly intensive contact of the vapor condensate K with the upwardly flowing wort vapor D take place as the result of the alternating arrangement between rotating column plates 11b and 11d and non-rotating column plates 11a, 11c, 11e. As an alternative or in addition to the rotating column plates, one or more rotating hoppers which spray the vapor condensate K may be provided.

Figure 4:
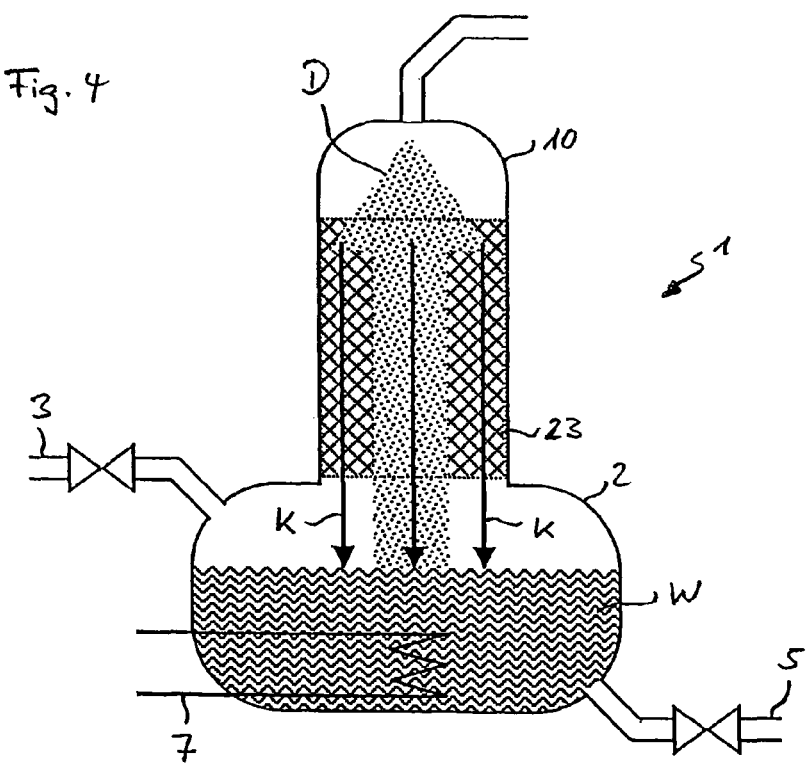
FIG. 4 shows a further alternative embodiment of the apparatus in which the vertical column is a packed column, in an illustration based on FIG. 1.

In a further variant of the apparatus 1 illustrated in FIG. 4, the vertical column 10 is designed as a packed column. The vertical column 10 thus comprises a column packing 23 instead of column plates as column inserts. The column packing 23 may optionally be provided as a rigid, ordered grid structure or as loose packing bodies. Similarly as for a plate column, the separation effect of a packed column is based on direct contact of the upwardly flowing wort vapor D with the vapor condensate K flowing in counterflow inside the column packing 23. In contrast to the plate column, the packed column does not have discrete, successive distillation steps. Rather, a continuously increasing depletion of volatile components in the wort vapor D results inside the column packing.

On account of the increased efficiency achieved by rectification of the wort vapor D, the minimum boiling time necessary for expelling the unwanted aromatic substances from the wort W may be so brief that the further biochemical reactions intended during the wort boiling may not be able to proceed to the desired extent within this time. In this case, the actual boiling phase is preceded by a preboiling phase in which the wort to be boiled is preheated according to a predetermined temperature cycle $T_2(t)$. The temperature of the wort W corresponding to the temperature cycle $T_2(t)$, the maximum value of which is preferably held at just below the boiling point of the wort, is set by a temperature regulator (not illustrated in greater detail).

Figure 5:
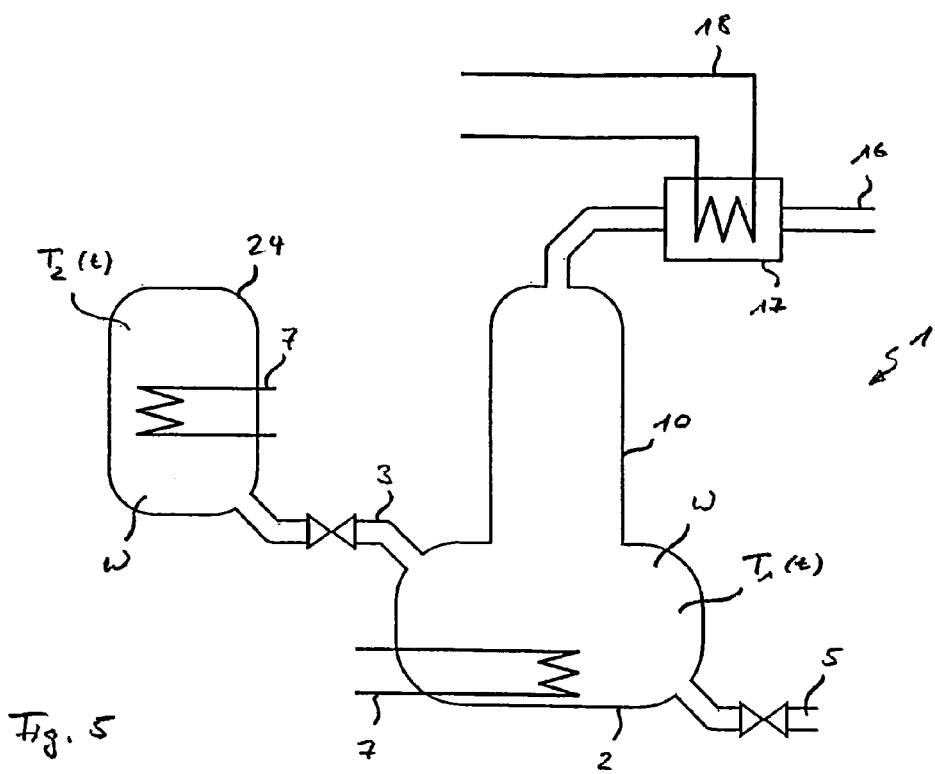
FIG. 5 shows a further alternative embodiment of the apparatus together with a preheating vessel situated upstream from the wort kettle, in an illustration based on FIG. 1.

The wort W preferably undergoes the preboiling phase after being introduced into the wort kettle 2, and thus, inside the wort kettle 2. In one embodiment variant of the apparatus 1 illustrated in FIG. 5, this preboiling phase instead takes place outside the wort kettle 2, in a preheating kettle 24 upstream from the wort kettle. After the preboiling phase is completed, the preheated wort W is introduced into the wort kettle 2 in a batchwise manner via the feed line 3. The vertical column 10, illustrated in FIG. 5 without column inserts for simplicity, is optionally designed as a plate column or a packed column.

Figure 6:
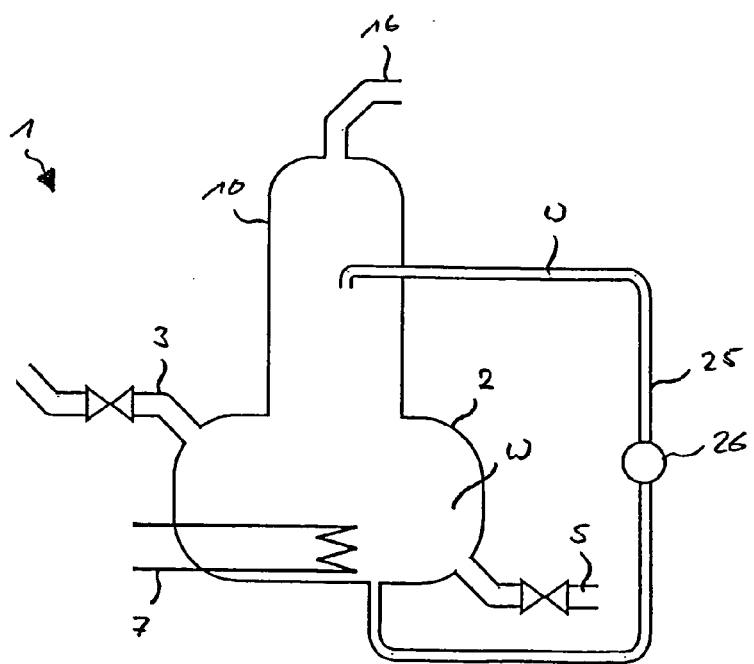
FIG. 6 shows a further alternative embodiment of the apparatus together with a recirculation line for removing the wort from the wort kettle and introducing it into the vertical column during the boiling phase, in an illustration based on FIG. 1.

A further variant of the apparatus 1 illustrated in FIG. 6 is used for carrying out a method variant in which during the boiling phase wort W is removed from the wort kettle 2 during the boiling phase and is supplied to the vertical column 10, so that the wort W is circulated. The region of the vertical column 10 situated below the point of introduction thus also acts as a stripping column with respect to the introduced wort W. For this purpose the apparatus 1 includes a recirculation line 25 which connects the bottom-side region of the wort kettle 2 to the vertical column 10. In principle, the recirculation line 25 may enter the vertical column 10 at any given height (in particular in the region of a given column plate 11a-11e). The wort W is preferably introduced into the head region 15 of the vertical column 10, in particular at the highest column plate 11e.

A circulating pump 26 which in particular is frequency-controlled is provided in the recirculation line 25. In the apparatus variant according to FIG. 6, the vertical column 10 may optionally be designed as a plate column or a packed column according to one of the previously described embodiment variants. An external heating element or device may also be provided as an alternative or in addition to the internal heating element 7 or device illustrated (not shown in greater detail here). The external heating element may in particular be situated in the recirculation line 25.

If in the case of the apparatus variant according to FIG. 6 a plate column is used, the column plates located in particular below the point of introduction may be mechanically drained after completion of the boiling phase, so that no wort W remains on the column plates. This drainage of the various column plates preferably occurs in a predetermined chronological sequence.

The apparatus variant according to FIG. 6 is optionally used in combination with a preheating kettle 24 and/or a heat exchanger 17 according to one of the previously described apparatus variants.

In view of performing the method in the simplest way possible, the boiling phase and, as the case may be, the preheating phase preferably take place at ambient pressure. Alternatively, for reasons of an improved energy balance the wort boiling may be carried out at negative pressure in the range of approximately 500 mbar to ambient pressure.

For simple cleaning of the apparatus 1, the wort kettle 2, vertical column 10, and, as the case may be, the preheating kettle 24 are connected to a cleaning-in-place (CIP) cleaning unit, as is already customary for cleaning the wort kettle in a conventional brewing facility.

To summarize, the invention combines the advantages of the classical discontinuous wort boiling, which consists in particular in its comparative ease of implementation and manageability, with the increase in efficiency achievable by a rectification process. In comparison to a simple boiling process, the latter is characterized by a significant reduction in overall evaporation required and, consequently, considerable energy savings.

In an embodiment of the method as discussed above, which is advantageous from a technical management standpoint, only the ascending wort vapor is supplied to the stripping column. A significant advantage of this method variant is that only the wort vapor and the vapor condensate present in the vertical column, and not the wort, come into contact with the vertical column and its fittings. On the other hand, poorly soluble wort constituents which tend to form solid residues remain in the region of the wort kettle during the boiling phase. The cleaning effort is thus significantly reduced.

In an alternative disclosed method embodiment, the wort is circulated during the boiling phase by removing the wort from the wort kettle, preferably from the bottom of the wort kettle, and introducing it into the vertical column. In this manner the vertical column simultaneously acts as a stripping column with respect to the introduced wort. Tests have shown that this circulation of the wort during the boiling phase results in particularly substantial depletion of aromatic substances. Furthermore, circulation of the wort during the boiling phase achieves improved homogenization of the wort, which in turn facilitates the protein coagulation and hot trub formation. The wort is circulated by means of a recirculation line which connects the wort kettle to the vertical column.

One advantage of the disclosed method variants and the corresponding apparatus therefor is that for the wort boiling a conventional wort kettle may be used, which essentially requires only mounting of a vertical column thereon in order to carry out the method according to the invention. This allows comparatively simple retrofitting of an existing, conventional brewing facility with respect to the method according to the invention. For this reason, the latter is also economically feasible for small and medium-sized breweries. The vapor condensate present in the vertical column is preferably recirculated to the wort kettle to keep the overall evaporation particularly low.

In order to, on the one hand, lower the overall evaporation to the minimum required for expulsion of the unwanted aromatic substances and for this purpose keep the boiling phase as brief as possible, while on the other hand ensure that the biochemical reactions which are set in motion with the wort boiling, in particular protein coagulation, enzyme destruction, wort sterilization, and hop isomerization, proceed to the desired extent, the wort to be boiled is preferably preheated in a preboiling phase which precedes the actual boiling phase, whereby the temperature of the wort during the preboiling phase is controlled according to a predetermined temperature cycle. The maximum temperature within this temperature cycle is preferably held at just below the boiling temperature of the wort.

To further improve the energy balance, it is practical in certain embodiments to feed the end vapor present in the head region of the vertical column to a heat exchanger, which acts as a condenser for the end vapor and in which the residual heat from the end vapor is at least partially recovered. The heat recovered in this manner is preferably used for heating process water for the wort preparation.

The vapor condensate present in the heat exchanger is preferably recirculated, at least in part, to the vertical column. To optimize energy consumption, it may be advantageous to control or regulate the reflux ratio of the vapor condensate, for example by means of a valve system, so as to achieve a particularly brief boiling period and/or a particularly low required overall evaporation. Instead of a customary condenser, a dephlegmator is preferably used as a heat exchanger. Tests in this regard have shown that combining the vertical column with a downstream dephlegmator results in particularly substantial depletion of unwanted aromatic substances having a low boiling point compared to water.

In one advantageous embodiment of the apparatus discussed above, the vertical column is designed as a plate column having at least one column plate. With regard to improved intermixture of the vapor condensate, at least one column insert, in particular a column plate for this plate column, is optionally rotationally driven about the axis of the vertical column.

Alternatively, as disclosed above, the vertical column is designed as a packed column having at least one rigid packing or a packing of loose packing bodies. Those skilled in the art will be capable of constructing column plates and column packings in accordance with the well known principles and configurations described in K. Sattler, "Thermische Trennverfarhen—Grundlagen, Auslegung, Apparte," 2nd Edition, VCH (Weinheim), 1995, Chapter 2.5.6, pp. 189-254, which is incorporated herein by reference.

LIST OF REFERENCE NUMERALS AND LETTERS

1 Apparatus
2 Wort kettle
3 Feed line
4 Intake valve
5 Discharge line
6 Exhaust valve
7 Heating element
8 Top region
9 Vapor outlet
10 Vertical column
11$a$-$e$ Column plate
12 Downcomer
13 Outer wall
14 Vapor passage
15 Head region
16 Vapor discharge line
17 Heat exchanger
18 Cooling/heating circuit
19 Return line
20 Overflow weir
21 Check valve
22 Shaft
23 Column packing
24 Preheating kettle
25 Recirculation line
26 Circulating pump
C Batch
D Wort vapor
K Vapor condensate
E End vapor
t Boiling time
$T_1(t)$ Boiling cycle
$T_2(t)$ Temperature cycle
W Wort While preferred embodiments of the invention have been depicted and described, it will be understood that various changes and modifications can be made other than those specifically mentioned above without departing from the spirit and scope of the invention, which is defined solely by the claims that follow.

What is claimed is:

1. A method of processing liquid wort comprising:
using a wort kettle having a lower region for holding the liquid wort and an upper region with a vapor outlet and a vertical column with a bottom that opens to the upper region of the wort kettle;
introducing into the wort kettle a discrete batch of liquid wort containing protein, malt enzymes, and bittering hops for use in brewing beer;
boiling the batch of liquid wort in the wort kettle for a predetermined time period to produce wort vapor occupying the upper region of the wort kettle, without adding to the discrete batch of liquid wort during the predetermined time period;
allowing liquid wort to remain in the lower region of the wort kettle during the boiling step;
feeding the wort vapor occupying the upper region of the wort kettle through the vapor outlet into the bottom of the vertical column during the boiling step;
permitting wort vapor condensate that forms in the vertical column to flow downward and into the wort kettle during the boiling step;
rectifying the wort vapor fed through the vapor outlet as the wort vapor rises upward through the vertical column;
withdrawing liquid wort remaining in the lower region of the wort kettle and introducing the withdrawn liquid wort into the vertical column at a location spaced vertically from the bottom thereof, wherein the withdrawn liquid wort introduced into the vertical column flows downward therein and back into the wort kettle while contacting the wort vapor rising upward in the vertical column; and
discharging the batch of wort from the wort kettle after the predetermined time period.

2. The method of claim 1, further including the step of removing end wort vapor from a head region of the column.

3. The method of claim 1, further including the step of introducing the wort vapor condensate and the withdrawn liquid wort introduced into the vertical column flowing downward in the vertical column into the wort kettle through the vapor outlet.

4. The method of claim 1, wherein all of the wort vapor condensate in the vertical column is permitted to flow downward and into the wort kettle during the boiling step.

5. A method of brewing beer comprising:
   processing liquid wort containing protein, malt enzymes, and bittering hops according to the method of claim 1; and
   brewing beer using the discharged batch of wort.

6. A method according to claim 1, further comprising the step of preheating the liquid wort according to a predetermined temperature cycle in a preboiling phase prior to the boiling step.

7. A method according to claim 2, further including the step of supplying the end wort vapor to a heat exchanger for heat recovery and condensation.

8. A method according to claim 7, further including the steps of recovering residual heat from the end wort vapor for heating process water and using the process water to prepare the liquid wort prior to the introducing step.

9. A method according to claim 7, further including the steps of returning a portion of the condensed end wort vapor to the vertical column as reflux and controlling the reflux ratio to reduce the predetermined time period or overall evaporation of the liquid wort or both.

10. A method according to claim 1, wherein the boiling step is carried out at a pressure between 500 mbar and ambient pressure.

11. A method according to claim 1, wherein the liquid wort is withdrawn from the bottom of the wort kettle.

* * * * *